United States Patent [19]

Holoman Jr. et al.

[11] 4,096,085
[45] Jun. 20, 1978

[54] GAS SCRUBBING SYSTEM

[75] Inventors: Smallwood Holoman Jr.; Robert G. Asperger, both of Midland, Mich.; Leroy S. Krawczyk, Lake Jackson, Tex.

[73] Assignee: The Dow Chemical Company, Midland, Mich.

[21] Appl. No.: 736,918

[22] Filed: Oct. 29, 1976

[51] Int. Cl.² ............................................. C09K 3/00
[52] U.S. Cl. .............................. 252/189; 252/389 R; 252/390; 252/391; 252/392; 203/7; 423/228; 423/229; 21/2.5 R; 21/2.7 R
[58] Field of Search ............... 252/189, 389 R, 390, 252/391, 392; 423/228, 229; 203/7; 21/2.5 R, 2.7 R

[56] References Cited

U.S. PATENT DOCUMENTS 3,959,170  5/1976  Mago et al. .......................... 252/189

*Primary Examiner*—Stephen J. Lechert, Jr.
*Attorney, Agent, or Firm*—Glwynn R. Baker

[57] ABSTRACT

An aqueous organic amine acid gas scrubbing system, particularly an aqueous N-methyldiethanolamine or diethanolamine acid gas scrubbing system having incorporated therein (1) a compound or mixture of compounds having the formula

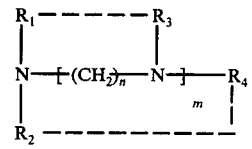

wherein $n$ is an integer from 1 to 3, $m$ is an integer from 2 to a number sufficient to yield a molecular weight of about 800, $R_1$, $R_2$, $R_3$ and $R_4$ are each independently selected from the group consisting of —H, —$C_{n'}H_{2n'}$OH, —$C_{n'}H_{2n'+1}$, —$C_{n'}H_{2n'}N(R_3)R_4$ wherein $n'$ is an integer from 1 to 2 and wherein $R_1$-$R_3$ and $R_2$-$R_4$ may be joined to form cyclic amines when $n$ is 2; said compound being present in about 10 to about 2000 parts per million parts of treating solution; (2) copper or a copper ion yielding compound in from 0 to 1000 ppm; and (3) sulfur or a sulfur atom yielding compound in from 0 to 1000 ppm.

15 Claims, No Drawings

GAS SCRUBBING SYSTEM

BACKGROUND OF INVENTION

Natural and synthetic gases containing acidic components such as $CO_2$, $H_2S$, COS, and the like, have been treated on a commercial scale with aqueous alkanolamine solutions to remove the acidic components. The severe corrosion which results from the presence of these components, particularly in the rich absorbent solution regeneration section, has necessitated keeping the concentration of the amine low, i.e., 10–30 percent generally and the loading, i.e. the amount of $H_2S/CO_2$, in the absorbent solution, low. In light of the recent energy shortage and necessity to conserve energy it would be advantageous to more heavily load the gas treating solutions with the acidic components. It would be a further advantage to employ more concentrated absorbent solutions. However to accomplish these objects it is necessary to prevent any increase in corrosion and it would be more advantageous to reduce the corrosion to less than that experienced today at the lower loadings and solution concentrations.

A brief review of the prior art discloses that numerous patents have taught various polyamines as corrosion inhibitors for various fluids:

For example, Dickson et al. in U.S. Pat. No. 3,262,791, which is representative of many patents in the corrosion inhibitor field issued to Petrolite Corporation, describes polyalkylenimines of molecular weight above 800 as useful in preventing corrosion of iron, steel and ferrous alloys when using slushing oils. The patent also suggests these polyalkylenimines as capable of imparting corrosion resistance to brines, weak inorganic acids, organic acids, $CO_2$, $H_2S$, etc.

Ting Sin Go in U.S. Pat. No. 3,819,328, also a Petrolite patent, discloses alkylene polyamines, such as ethylene diamine, to control acid corrosion in distillation columns, such as occurs in petroleum distillation columns. Preferably the alkylene polyamine is used in conjunction with a corrosion inhibitor, e.g., a film-forming corrosion inhibitor, i.e., morpholine, at regulated pH's of about 2. The corrosion of columns which have water condensers and which water has a high pH due to acidic materials such as $H_2S$, HCN, $CO_2$, HCl, etc. is taught to be controlled.

Ulrich et al. in U.S. Pat. No. 2,143,393 discloses absorbing acid gases in an aqueous solution of a polymerized alkylenimine.

Johnson et al. in U.S. Pat. No. 3,137,654 teach using glycines as a corrosion inhibitor in an alkanolamine solution used to absorb $CO_2$ from industrial gases.

Yeakey et al. in U.S. Pat. No. 3,829,494 teach using a water-soluble trialkanolamine in an aqueous 2-(2-aminoethoxy)ethanol gas scrubbing medium.

Singh in U.S. Pat. No. 3,535,260 teaches a similar result for monoethanolamine gas treating solutions.

The art is rife with disclosures of nitrogen containing compounds useful as corrosion inhibitors, but that only a few are commercially acceptable. It is evident to one skilled in the art operating a commercial installation that the old limitations on concentration of absorbent, loading of the absorbent solution, etc., while improved to some extent with these few commercially accepted inhibitors are lacking in ability to carry without excessive corrosion the demands for more efficient operation, higher absorbent concentrations and higher loading, brought on by the energy shortage.

Is is therefore an object of the present invention to provide an inhibitor for aqueous amine gas absorbing systems which will enable higher concentrations of the amine absorbent to be used as well as a higher loading of the acid gases in the absorbent with reduced corrosion.

These and other advantages of the present invention will be apparent to those skilled in the art from the following disclosure and claims.

BRIEF DESCRIPTION OF INVENTION

In accordance with the present invention, a gas scrubbing solution, e.g., an aqueous alkanolamine solution, particularly, diethanolamine and N-methyldiethanolamine solutions, is rendered less corrosive toward metals, particularly ferrous metal and their alloys by incorporating into the solution from about 10 to about 3000 parts of an inhibitor composition consisting essentially of (1) from 10 to 2000 ppm of a compound having the formula

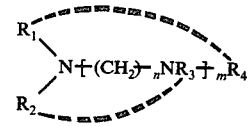

wherein n is an integer from 1 to 3, m is an integer from 2 to an integer sufficient to yield a molecular weight of about 800; each R represents an independently selected member from the group consisting of —H, —$C_{n'}H_{2n'}$OH; —$C_{n'}H_{2n'+1}$; $C_{n'}H_{2n'}N(R_3)R_4$; wherein $n'$ is an integer from 1 to 2 and wherein $R_1$–$R_3$ and $R_2$–$R_4$ may be joined together to form cyclic amines when $n'$ is 2; (2) copper or a copper ion yielding compound in from 0 to 1000 ppm; and (3) sulfur or a sulfur atom yielding compound in from 0 to 1000 ppm.

Amine compounds falling within the scope of the formula set out above are for example, polyethylenimine (polyethylene polyamines) having molecular weights from about 60 to about 800 which may be mixtures of several amines, for example a commercial polyalkylene polyamine identified as EA-10 (or E-100) containing 8–9 weight percent tetraethylenepentamine, 30–35 weight percent pentaethylenehexamine, 55 weight percent hexaethyleneheptamine and the remainder branched and cyclic isomers, polyethylenimines, PEI 3 (molecular weight 300±50), PEI 6 (molecular weight about 600), EA-17 tris(aminoethyl)amine (about 90 percent branched), EA-19 pentaethylenehexamine (MW about 232), EA-15 (a mixture of 35–45 percent diethylenetriamine, 10–15 percent triethylenediamine, 5–15 percent piperazine), EA-25 (reaction product of triethylenetetramine divinylbenzene), EA-26 (a divinylbenzene-ethylvinylbenzene-diethylenetriamine mixture), EA-11 (aminoethylpiperazine-diethylenetriamine mixture), 1,2-polypropylenimine, tetraethylenepentamine, triethylenetetramine, diethylenetriamine, ethylenediamine, dihydroxyethyl ethylenediamine, and the like.

Copper metal or a copper ion yielding compound such as $CuCO_3$, or the like may be employed. (Get scope from earlier case.)

Sulfur or a sulfur ion yielding compound may be present and is present in those compositions containing $H_2S$, COS or other sulfur containing constituents.

The inhibitors are most effective in diethanolamine solutions where the $H_2S$ to $CO_2$ ratio is 10/1 to 1/10, respectively. The inhibitors reduce corrosion compared to present day inhibitors in systems containing up to 1/40 H₂S/CO₂, respectively. The absorbents DEA and MDEA are effectively provided with less corrosion than present day inhibitor systems with H₂S only but the results are not as dramatic as when CO₂ is present also.

The alkanolamines which have been employed as absorbents for the acidic gas are the mono $C_{2-3}$ alkanolamines, such as monoethanolamine, monisopropanolamine, the dialkanol $C_{2-3}$ amines, such as diethanolamine and their N-alkyl substituted derivatives, i.e., methyl diethanolamine. The dialkanolamines show marked improvement in corrosion protection when the inhibitors of the present invention are employed.

DETAILED DESCRIPTION OF THE INVENTION

PROCEDURE

The laboratory data were obtained from tests run in a modified Sparkler Filter at 40 psig, at a temperature at 125° C for about 17 hours. All 1020 mild steel test specimens (which were acid etched in 5N HCl, soap washed, water and acetone rinsed and weighted) were placed in 4 oz bottles containing the prospective inhibitor and 50% diethanolamine (DEA) —50 percent water, saturated with H₂S/CO₂ at various gas ratios. The total liquid volume in each bottle at the start of the experiment was 120 mls. At the end of the experiment, the mild steel specimens were again etched in acid (containing HCl inhibitor) washed with soap and water and acetone rinsed and weighed. The corrosion rate and percent inhibition were calculated using the before and after weighing of the mild steel specimens according to the following equations:

$$\text{corrosion rate/yr} = (534 \, W/DAT)$$

where W = weight loss in mg; D = density of specimen in gm/cc; A = area in square inches; and T = exposure in hours.

$$\% \text{ inhibition} = \text{avg. } CR \text{ blank} - \frac{CR \text{ test blank}}{\text{avg. } CR \text{ blank}} \times 100$$

Each of the following tables tabulate the experiments conducted and the results obtained in a single series of tests. The corrosion rate for the uninhibited, blank tests was run for each series to enable a direct comparison to be made with the other tests run in that series.

TABLE I

50% DEA H₂S/CO₂ 9/1

| COmpound | PPM | PPM | PPM | Corrosion Rate MPY | Percent Inhibition |
|---|---|---|---|---|---|
| 1. Blank | | | | 31.54 | |
| 2. Blank | | | | 31.78 | |
| 3. Blank | | | | 31.32 | |
| 4. CuCO₃ | 100 | | | 14.09 | 55.3 |
| 5. " | 100 | | | 12.84 | 59.3 |
| 6. " | 1000 | | | 9.70 | 69.3 |
| 7. " | 1000 | | | 10.09 | 68.0 |
| 8. CuCO₃ + 10 cc MEA⁽¹⁾ | 100 | | | 5.48 | 82.6 |
| 9. " | 100 | | | 4.38 | 86.1 |
| 10. " | 1000 | | | 4.69 | 85.1 |
| 11. " | 1000 | | | 4.78 | 84.9 |
| 12. CuCO₃ + 10 cc MEA⁽¹⁾ + S° | 100 | 100 | | 5.55 | 82.4 |
| 13. " | 100 | 100 | | 5.24 | 83.4 |
| 14. " | 1000 | 100 | | 4.69 | 85.1 |
| 15. " | 1000 | 100 | | 4.55 | 85.6 |
| 16. " | 100 | 1000 | | 4.71 | 85.1 |
| 17. " | 100 | 1000 | | 6.65 | 78.9 |
| 18. S° | | 100 | | 36.48 | −15.6 |
| 19. " | | 100 | | 33.82 | −7.2 |
| 20. 10 cc MEA⁽¹⁾ | | | | 33.11 | −4.9 |
| 21. " | | | | 30.84 | 2.2 |
| 22. PEI 6⁽²⁾ | 100 | | | 4.06 | 87.1 |
| 23. " | 100 | | | 4.22 | 86.6 |
| 24. " | 1000 | | | 2.82 | 91.1 |
| 25. " | 1000 | | | 2.04 | 93.5 |

⁽¹⁾MEA - monoethanolamine
⁽²⁾PEI 6 - polyethylenime molecular weight about 600

RESULTS

Observation of data from 6 tests shows compounds PEI 6, CuCo₃ + 10 cc MEA, E-100, and E-100 + CuCO₃ + S° as very good protectors of mild steel specimen in 50 percent aqueous DEA solutions and an H₂S/CO₂ environment. Passivation was observed from 84 percent to 96 percent inhibition. E-100 offers protection at concentrations as low as 1 ppm with 74 percent inhibition; and with the addition of CuCO₃ + S° an additive effect is seen with passivation around 96 percent to 97 percent.

TABLE II

50% DEA H₂S/CO₂ 9/1

| Compound | PPM | PPM | PPM | Corrosion Rate MPY | Percent Inhibition |
|---|---|---|---|---|---|
| 1. Blank | | | | 40.91 | |
| 2. Blank | | | | 40.59 | |
| 3. Blank | | | | 39.97 | |
| 4. PEI 6⁽¹⁾ | 100 | | | 3.76 | 90.7 |
| 5. " | 100 | | | 2.50 | 93.8 |
| 6. " | 1000 | | | 2.09 | 94.8 |
| 7. " | 1000 | | | 5.53 | 86.4 |
| 8. " | 2000 | | | 5.11 | 87.4 |
| 9. " | 2000 | | | 5.64 | 86.1 |
| 10. PEI 6⁽¹⁾ + CuCO₃ | 100 | 1000 | | 3.34 | 91.7 |
| 11. " | 100 | 1000 | | 3.23 | 92.0 |

TABLE II-continued

50% DEA $H_2S/CO_2$ 9/1

| Compound | PPM | PPM | PPM | Corrosion Rate MPY | Percent Inhibition |
|---|---|---|---|---|---|
| 12. " | 1000 | 100 | | 2.29 | 94.3 |
| 13. " | 1000 | 100 | | 2.82 | 93.0 |
| 14. " | 1000 | 1000 | | 3.12 | 92.3 |
| 15. " | 1000 | 1000 | | 2.82 | 93.0 |
| 16. PEI 6[1] + $CuCO_3$ + S° | 1000 | 100 | 1000 | 3.03 | 92.5 |
| 17. " | 1000 | 100 | 1000 | 2.20 | 94.6 |
| 18. " | 1000 | 1000 | 100 | 2.71 | 93.3 |
| 19. " | 1000 | 1000 | 100 | 2.72 | 93.3 |
| 20. $CuCO_3$ | | 100 | | 12.63 | 68.8 |
| 21. " | | 100 | | 13.36 | 67.0 |
| 22. " | | 1000 | | 12.42 | 69.3 |
| 23. " | | 1000 | | 13.89 | 65.7 |
| 24. $CuCO_3$ + $Co(OAc)_2$ | 1000 | 1000 | | 11.18 | 72.4 |
| 25. " | 1000 | 1000 | | 10.54 | 74.0 |
| 26. PEI 6[1] + $Co(OAc)_2$ | 1000 | 1000 | | 4.49 | 88.9 |
| 27. " | 1000 | 1000 | | 23.06 | 43.1 |
| 28. $Co(OAc)_2$ | 1000 | | | 25.37 | 37.3 |
| 29. " | 1000 | | | 24.52 | 39.4 |
| 30. $Co(OAc)_2$ + S° | 1000 | 100 | | 36.32 | 10.3 |
| 31. " | 1000 | 100 | | 35.59 | 12.1 |
| 32. PEI 6[1] + $CuCO_3$ + MEA 10 cc | 1000 | 1000 | | 2.20 | 94.6 |
| 33. " | 1000 | 1000 | | 2.50 | 93.8 |

[1] PEI 6 a polyethylenimine of molecular weight of about 600

TABLE III

50% DEA $H_2S/CO_2$ 9/1

| Compound | PPM | PPM | PPM | Corrosion Rate MPY | Percent Inhibition |
|---|---|---|---|---|---|
| 1. Blank | | | | 31.31 | |
| 2. Blank | | | | 31.98 | |
| 3. Blank | | | | 32.12 | |
| 4. $CuCO_3$ | | 1000 | | 8.33 | 73.8 |
| 5. " | | 1000 | | 8.70 | 72.6 |
| 6. $Co(OAc)_2$ + $CuCO_3$ + PEI 6 | 1000 | 1000 | 1000 | 2.73 | 91.4 |
| 7. " | 1000 | 1000 | 1000 | 2.57 | 91.9 |
| 8. E-100[1] | 1000 | | | 1.99 | 93.7 |
| 9. " | 1000 | | | 2.14 | 93.3 |
| 10. E-100 + $CuCO_3$ | 1000 | 1000 | | 2.73 | 91.4 |
| 11. " | 1000 | 1000 | | 2.21 | 93.0 |
| 12. E-100 + $CuCO_3$ + PEI 6 | 1000 | 1000 | 1000 | 1.76 | 94.5 |
| 13. " | 1000 | 1000 | 1000 | 2.06 | 93.5 |
| 14. $Cr(NO_3)_3$ | 1000 | | | 25.12 | 21.0 |
| 15. " | 1000 | | | 24.83 | 21.9 |
| 16. $Cr(NO_3)_3$ + $KMnO_4$ | 1000 | <100 | | 26.37 | 17.1 |
| 17. " | 1000 | <100 | | 28.00 | 11.9 |
| 18. $Cd(OAc)_2$ | 1000 | | | 31.98 | −0.6 |
| 19. " | 1000 | | | 31.31 | 1.6 |
| 20. $Cd(OAc)_2$ + $KMnO_4$ | 1000 | <100 | | 34.04 | −7.0 |
| 21. " | 1000 | <100 | | 35.16 | −10.5 |
| 22. $Co(OAc)_2$ | 1000 | | | 23.36 | 26.5 |
| 23. " | 1000 | | | 23.86 | 25.0 |

[1] E-100 is a polyethylene polyamine mixture having a molecular weight of about 250–300

TABLE IV

50% DEA $H_2S/CO_2$ 9/1

| Compound | PPM | PPM | PPM | Corrosion Rate MPY | Percent Inhibition |
|---|---|---|---|---|---|
| 1. Blank | | | | 20.52 | |
| 2. Blank | | | | 19.90 | |
| 3. Blank | | | | 21.64 | |
| 4. E-100[1] | 100 | | | 1.88 | 90.9 |
| 5. " | 100 | | | 1.88 | 90.0 |
| 6. " | 1000 | | | 1.47 | 92.9 |
| 7. " | 1000 | | | 2.02 | 90.2 |
| 8. " | 2000 | | | 1.88 | 90.9 |
| 9. " | 2000 | | | 1.73 | 91.6 |
| 10. E-100[1] + $Co(OAc)_2$[2] | 1000 | 1000 | | 3.62 | 82.5 |
| 11. " | 1000 | 1000 | | 1.82 | 91.2 |
| 12. E-100 + PEI 6 | 1000 | 1000 | | 1.94 | 90.6 |
| 13. " | 1000 | 1000 | | 2.02 | 90.2 |
| 14. E-100 + 10 cc MEA[3] | 1000 | | | 2.02 | 90.2 |
| 15. " | 1000 | | | 1.53 | 92.6 |
| 16. 10 cc MEA[3] | | | | 27.69 | −33.9 |
| 17. " | | | | 28.66 | −38.6 |
| 18. PEI 6[3] | | 1000 | | 2.72 | 86.9 |
| 19. " | | 1000 | | 2.29 | 88.9 |
| 20. $Co(OAc)_2$ | | 1000 | | 14.40 | 30.4 |
| 21. " | | 1000 | | 20.66 | 0.1 |
| 22. K-437[4] | 1000 | | | 12.38 | 40.2 |
| 23. " | 1000 | | | 10.22 | 50.6 |
| 24. KW-12[5] | 1000 | | | 9.32 | 54.9 |
| 25. " | 1000 | | | 9.67 | 53.2 |

[1] E-100 a polyethylene polyamine mixture, avg. MW 250–300
[2] $Co(OAc)_2$ cobalt acetate
[3] MEA monoethanolamine
[4] Commercial corrosion inhibitor for DEA and MEA manufactured by Petrolite and sold under trade name K-437
[5] Commercial corrosion inhibitor for DEA and MEA manufactured by Petrolite and sold under trade name KW-12

TABLE V

50% DEA $H_2S/CO_2$ 9/1

| Compound | PPM | PPM | PPM | Corrosion Rate MPY | Percent Inhibition |
|---|---|---|---|---|---|
| 1. Blank | | | | 31.78 | |
| 2. Blank | | | | 41.65 | |
| 3. Blank | | | | 37.26 | |
| 4. E-100 | 10 | | | 7.60 | 79.4 |
| 5. " | 10 | | | 7.36 | 80.1 |
| 6. " | 50 | | | 7.13 | 80.7 |
| 7. " | 50 | | | 6.89 | 81.3 |
| 8. " | 100 | | | 7.82 | 78.8 |

TABLE V-continued

50% DEA $H_2S/CO_2$ 9/1

| Compound | PPM | PPM | PPM | Corrosion Rate MPY | Percent Inhibition |
|---|---|---|---|---|---|
| 9. " | 100 | 6.96 | 81.1 | | |
| 10. " | 1000 | | | 6.89 | 81.3 |
| 11. " | 1000 | | | 8.46 | 77.1 |

TABLE VI

50% DEA $H_2S/CO_2$ 1/1

| Compound | PPM | PPM | PPM | PPM | Corrosion Rate MPY | Percent Inhibition |
|---|---|---|---|---|---|---|
| 1. Blank | | | | | 25.27 | |
| 2. Blank | | | | | 26.22 | |
| 3. Blank | | | | | 24.90 | |
| 4. E-100 | 1 | | | | 6.55 | 74.3 |
| 5. " | 1 | | | | 6.62 | 74.0 |
| 6. " | 10 | | | | 5.67 | 77.8 |
| 7. " | 10 | | | | 5.08 | 80.0 |
| 8. " | 100 | | | | 1.70 | 93.3 |
| 9. " | 100 | | | | 1.62 | 93.6 |
| 10. " | 1000 | | | | 1.62 | 93.6 |
| 11. " | 1000 | | | | 1.47 | 94.2 |
| 12. $CuCO_3$ Lot 6750 | 100 | | | | 7.96 | 68.7 |
| 13. " | 100 | | | | 7.51 | 70.5 |
| 14. " | 1000 | | | | 6.41 | 74.8 |
| 15. " | 1000 | | | | 8.17 | 67.9 |
| 16. S° | 100 | | | | 22.62 | 11.2 |
| 17. " | 100 | | | | 23.73 | 6.8 |
| 18. " | 1000 | | | | 23.57 | 7.4 |
| 19. " | 1000 | | | | 22.39 | 12.1 |
| 20. E-100 + $CuCO_3$ + S° | 1000 | 100 | | 1000 | 0.97 | 96.2 |
| 21. " | 1000 | 100 | | 1000 | 0.88 | 96.6 |
| 22. " | 1000 | 1000 | | 1000 | 1.10 | 95.7 |
| 23. " | 1000 | 1000 | | 1000 | 1.03 | 95.9 |
| 24. $CuCO_3$ + S° | | 1000 | | 1000 | 8.46 | 66.8 |
| 25. " | | 1000 | | 1000 | 8.10 | 68.2 |

In the following tables, data is presented demonstrating the results achieved with various compounds falling within the scope of the invention as well as results obtained with closely related compounds and commercially available compositions. Abbreviations used hereinafter are set forth here to facilitate comprehension of the data.

| Code | Abbreviations Description |
|---|---|
| E-100 | Polyethylene polyamine MW ca 250-300 |
| PEI 6 | Polyethylenimine avg. MW 600 |
| EA-13 | Distilled E-100 |
| EA-14 | Bis(2-hydroxyethyl) piperazine |
| VE-1 | Bis(2-aminoethyl ether) |
| EA-15 | Ethyleneamine (NC2189L) |
| EA-17 | Tris(2-aminoethyl)amine 90% Branched 10% Linear |
| EA-19 | Pentaethylenehexamine |
| EA-22 | Aminated Polypropylene Glycol |
| EA-23 | Dodecylamine + 2EO[1] + 4BO[2] |
| EA-25 | Triethylenetetraamine-Divinyl Benzene TETA-DVB Polymer |
| EA-26 | Ethylvinylbenzene (EVB) Divinylbenzene (DVB) Ethylvinylbenzene (EVB) Diethylenetriamine (DETA) Polymer |
| EA-27 | MeCl Quat, DVB-DETA |
| EA-28 | 2-methyl Imidazoline |
| EA-29 | Piperazine |
| EA-18 | Dowell Corban 326 |
| EA-10 | E-100 |
| DETA | Diethylenetriamine |
| TRT3 (KW-17) | Commercial inhibitor Petrolite KW-17 |
| EA-75 | Polyethylenimine (E-75) filtered solids from E-100 |
| PEI 3 | Polyethylenimine avg. MW 300 |
| TEPA | Tetraethylenepentaamine |
| RCC-9 | Tetradecylalkyl pyridinium bromide |
| FO-3 | Commercial quaternary amine |
| SH-1 | 70 gm MEA, 3 g CuS, 15 gm S° |
| OA-70 | Organic amine 70 a mixture of polyamines |

| Code | Abbreviations Description |
|---|---|
| | sold by The Dow Chemical Company |

[1] EO - ethylene oxide
[2] BO - 1,2-butylene oxide

The data in each of the following tables was obtained using the indicated compound(s) in the manner set forth in Example 1.

PROCEDURE

A 50 percent solution of N-methyl diethanolamine (N-MDEA) was saturated with $H_2S/CO_2$ gases at a ratio of 9/1. Prospective inhibitors for N-MDEA were tested in the same manner used to test compounds for diethanolamine (DEA) inhibition. The corrosion rate and percent inhibition were determined by the same method used for DEA.

TABLE VII

50% N-Methyl Dea $H_2S/CO_2$ 9/1

| | Compound | PPM | PPM | PPM | Corrosion Rate | Percent Inhibition |
|---|---|---|---|---|---|---|
| 1. | Blank | | | | 25.64 | |
| 2. | Blank | | | | 24.83 | |
| 3. | Blank | | | | 27.78 | |
| 4. | EA-10 (E-100) | 10 | | | 18.49 | 29.1 |
| 5. | " | 10 | | | 19.15 | 26.6 |
| 6. | " | 100 | | | 2.14 | 91.8 |
| 7. | " | 100 | | | 1.91 | 92.7 |
| 8. | EA-75 (E-75) | 10 | | | 21.45 | 17.8 |
| 9. | " | 10 | | | 23.64 | 9.4 |
| 10. | " | 100 | | | 1.84 | 92.9 |
| 11. | " | 100 | | | 1.84 | 92.9 |
| 12. | PEI-3 | 10 | | | 2.43 | 90.7 |
| 13. | " | 10 | | | 2.57 | 90.1 |
| 14. | " | 100 | | | 1.62 | 93.8 |
| 15. | " | 100 | | | 2.07 | 92.1 |
| 16. | PEI-6 | 10 | | | 2.59 | 90.1 |
| 17. | " | 10 | | | 7.96 | 69.5 |
| 18. | " | 100 | | | 1.99 | 92.4 |
| 19. | " | 100 | | | 1.70 | 93.5 |
| 20. | TRT-3 (KW-17) | 1000 | | | 1.92 | 92.6 |
| 21. | TRT-3 (KW-17) | 1000 | | | 2.50 | 90.4 |
| 22. | TRT-3 (KW-17) | 100 | | | 6.99 | 7.32 |
| 23. | TRT-3 (KW-17) | 100 | | | 4.34 | 83.4 |
| 24. | $CuCO_3$ | 10 | | | 16.50 | 36.7 |
| 25. | CuCo | 10 | | | 16.79 | 35.6 |
| 26. | $CuCO_3$+S° | 10 | 10 | | 16.94 | 35.1 |
| 27. | $CuCO_3$+S° | 10 | 10 | | 18.42 | 29.4 |

TABLE VII-continued

50% N-Methyl Dea H₂S/CO₂ 9/1

|     | Compound | PPM | PPM | PPM | Corrosion Rate | Percent Inhibition |
|-----|----------|-----|-----|-----|----------------|--------------------|
| 28. | S° |  |  | 10 | 27.25 | −4.5 |
| 29. | S° |  |  | 10 | 27.03 | −3.6 |
| 30. | EA-10+CuCO₃+S° | 10 | 10 | 10 | 2.28 | 91.3 |
| 31. | EA-10+CuCO₃+S° | 10 | 10 | 10 | 2.28 | 91.3 |
| 32. | EA-75+CuCO₃+S° | 10 | 10 | 10 | 2.59 | 90.1 |
| 33. | EA-75+CuCO₃+S° | 10 | 10 | 10 | 2.28 | 91.3 |
| 34. | PEI-3+CuCO₃+S° | 10 | 10 | 10 | 1.98 | 92.4 |
| 35. | PEI-3+CuCO₃+S° | 10 | 10 | 10 | 1.91 | 92.7 |
| 36. | PEI-6+CuCO₃+S° | 10 | 10 | 10 | 2.80 | 89.3 |
| 37. | PEI-6+CuCO₃ ₁ ₊ S° | 10 | 10 | 10 | 2.90 | 85.0 |

RESULTS AND DISCUSSION

The data, listed in Table VII, shows that those compounds which were effective in preventing corrosion in DEA, were just as effective in inhibiting corrosion in N-methyl DEA. At 100 ppm, the materials offered protection around 93 percent and the polyamine, CuCO₃ and S° synergistic system also showed excellent protection of mild steel.

TABLE VIII

50% DEA H₂S/CO₂ 9/1

|     | Compound | PPM | PPM | PPM | Corrosion Rate MPY | Percent Inhibition |
|-----|----------|-----|-----|-----|--------------------|--------------------|
| 1. | Blank |  |  |  | 42.06 | 10.5 |
| 2. | Blank |  |  |  | 46.64 | 0.7 |
| 3. | Blank |  |  |  | 52.24 | −11.2 |
| 4. | E-100 (EA-10) | 1000 |  |  | 1.84 | 96.1 |
| 5. | " | 1000 |  |  | 1.47 | 96.9 |
| 6. | WS-1 | 1000 |  |  | 3.17 | 93.3 |
| 7. | " | 1000 |  |  | 2.80 | 94.0 |
| 8. | EA-13 | 1000 |  |  | 2.06 | 95.6 |
| 9. | " | 1000 |  |  | 2.28 | 95.1 |
| 10. | EA-14 | 1000 |  |  | 53.11 | −13.1 |
| 11. | " | 1000 |  |  | 49.73 | −5.9 |
| 12. | EA-15 | 1000 |  |  | 6.92 | 85.3 |
| 13. | " | 1000 |  |  | 7.66 | 83.7 |
| 14. | EA-17 | 1000 |  |  | 1.99 | 95.8 |
| 15. | " | 1000 |  |  | 2.51 | 94.7 |
| 16. | EA-19 | 1000 |  |  | 2.14 | 95.5 |
| 17. | " | 1000 |  |  | 2.28 | 95.1 |
| 18. | EA-22 | 1000 |  |  | 56.36 | −20.0 |
| 19. | " | 1000 |  |  | 56.65 | −20.6 |
| 20. | EA-23 | 1000 |  |  | 52.30 | −11.3 |
| 21. | " | 1000 |  |  | 47.89 | −1.9 |
| 22. | EA-25 | 1000 |  |  | 8.91 | 81.0 |
| 23. | " | 1000 |  |  | 8.10 | 82.7 |
| 24. | EA-26 | 1000 |  |  | 7.96 | 83.1 |
| 25. | " | 1000 |  |  | 7.51 | 84.0 |
| 26. | EA-29 Piperazine | 1000 |  |  | 29.46 | 37.3 |
| 27. | " | 1000 |  |  | 28.88 | 38.5 |
| 28. | Diethylenetriamine | 1000 |  |  | 16.36 | 65.2 |
| 29. | " | 1000 |  |  | 24.17 | 48.6 |
| 30. | EA-28 | 1000 |  |  | 59.52 | −26.7 |
| 31. | " | 1000 |  |  | 58.79 | −25.1 |
| 32. | EA-18 | 1000 |  |  | 48.47 | −3.2 |
| 33. | ∝ | 1000 |  |  | 48.32 | −2.9 |
| 34. | EA-27 | 1000 |  |  | 10.16 | 78.4 |
| 35. | " | 1000 |  |  | 10.24 | 78.2 |

TABLE IX

50% DEA H₂S/CO₂ 9/1

|     | Compound | PPM | PPM | PPM | Corrosion Rate MPY | Percent Inhibition |
|-----|----------|-----|-----|-----|--------------------|--------------------|
| 1. | Blank |  |  |  | 35.95 | −1.6 |
| 2. | Blank |  |  |  | 33.89 | 4.2 |
| 3. | Blank |  |  |  | 36.32 | −2.6 |
| 4. | E-100 | .5 |  |  | 6.92 | 80.4 |
| 5. | " | .5 |  |  | 6.70 | 81.1 |
| 6. | " | 10 |  |  | 8.62 | 75.6 |
| 7. | " | 10 |  |  | 9.14 | 74.2 |
| 8. | " | 1000 |  |  | 1.10 | 96.9 |
| 9. | " | 1000 |  |  | 1.03 | 97.1 |
| 10. | CuCO₃ | 100 |  |  | 11.71 | 66.9 |
| 11. | " | 100 |  |  | 11.34 | 67.9 |
| 12. | " | 1000 |  |  | 9.22 | 74.0 |
| 13. | " | 1000 |  |  | 9.72 | 72.5 |
| 14. | S° | 100 |  |  | 26.97 | 23.8 |
| 15. | " | 100 |  |  | 29.61 | 16.3 |
| 16. | " | 1000 |  |  | 23.36 | 34.0 |
| 17. | " | 1000 |  |  | 23.73 | 32.9 |
| 18. | CuCO₃+S° | 100 | 100 |  | 11.49 | 67.5 |
| 19. | " | 100 | 100 |  | 11.27 | 68.1 |
| 20. | " | 1000 | 100 |  | 10.16 | 71.3 |
| 21. | " | 1000 | 100 |  | 10.61 | 70.0 |
| 22. | E-100+CuCO₃ | 10 | 100 |  | 1.26 | 96.4 |
| 23. | " | 10 | 100 |  | 1.25 | 96.5 |
| 24. | " | 10 | 1000 |  | 1.54 | 95.6 |
| 25. | " | 10 | 1000 |  | 1.47 | 95.8 |
| 26. | " | 1000 | 100 |  | 1.18 | 96.7 |
| 27. | " | 1000 | 100 |  | 1.18 | 96.7 |
| 28. | E-100+S° | 10 | 100 |  | 8.25 | 76.7 |
| 29. | " | 10 | 100 |  | 8.04 | 77.3 |
| 30. | " | 10 | 1000 |  | 6.92 | 80.4 |
| 31. | " | 10 | 1000 |  | 5.68 | 84.0 |
| 32. | " | 1000 | 100 |  | 1.11 | 96.9 |
| 33. | " | 1000 | 100 |  | 1.26 | 96.4 |
| 34. | E-100+CuCO₃+S° | 10 | 100 | 100 | 1.47 | 95.8 |
| 35. | " | 10 | 100 | 100 | 1.33 | 96.3 |
| 36. | " | 10 | 1000 | 100 | 1.25 | 96.5 |
| 37. | " | 10 | 1000 | 100 | 1.33 | 96.3 |
| 38. | " | 1000 | 100 | 100 | 1.26 | 96.4 |
| 39. | " | 1000 | 100 | 100 | 1.25 | 96.5 |

TABLE X

50% DEA H₂S/CO₂ 9/1

|     | Compound | PPM | PPM | PPM | Corrosion Rate MPY | Percent Inhibition |
|-----|----------|-----|-----|-----|--------------------|--------------------|
| 1 | Blank |  |  |  | 31.24 | 1.5 |
| 2. | Blank |  |  |  | 32.85 | −3.6 |
| 3. | Blank |  |  |  | 31.01 | 2.2 |
| 4. | E-100 | 1 |  |  | 12.68 | 60.0 |
| 5. | " | 1 |  |  | 14.51 | 54.2 |
| 6. | " | 10 |  |  | 2.72 | 91.4 |
| 7. | " | 10 |  |  | 2.80 | 91.2 |
| 8. | " | 100 |  |  | 1.33 | 95.8 |
| 9. | " | 100 |  |  | 1.33 | 95.8 |
| 10. | CuCO₃ in DEA[1] | 10 |  |  | 14.30 | 54.9 |
| 11. | " | 10 |  |  | 14.59 | 54.0 |
| 12. | CuCO₃ | 100 |  |  | 12.81 | 59.6 |
| 13. | " | 100 |  |  | 12.38 | 61.0 |
| 14. | S° in MEA[2] | 10 |  |  | 28.14 | 11.2 |
| 15. | " | 10 |  |  | 27.33 | 13.8 |
| 16. | S° | 100 |  |  | 24.38 | 23.1 |
| 17. | " | 100 |  |  | 24.38 | 23.1 |
| 18. | E-100+CuCO₃ | 1 | 10 |  | 1.47 | 95.4 |
| 19. | " | 1 | 10 |  | 1.47 | 95.4 |
| 20. | " | 10 | 10 |  | 1.39 | 95.6 |
| 21. | " | 10 | 10 |  | 1.33 | 95.8 |
| 22. | " | 10 | 100 |  | 1.25 | 96.1 |
| 23. | " | 10 | 100 |  | 1.39 | 95.6 |
| 24. | E-100 +CuCO₃+S° | 1 | 10 | 10 | 1.76 | 94.4 |
| 25. | " | 1 | 10 | 10 | 1.78 | 94.4 |
| 26. | " | 10 | 10 | 10 | 1.33 | 95.8 |
| 27. | " | 10 | 10 | 10 | 1.47 | 95.4 |
| 28. | " | 10 | 100 | 10 | 1.25 | 96.1 |
| 29. | " | 10 | 100 | 10 | 1.26 | 96.0 |
| 30. | " | 10 | 100 | 1.54 | 95.1 |  |
| 31. | " | 10 | 100 | 100 | 1.17 | 96.3 |
| 32. | E-100+Co(OAc)₂ | 10 | 100 |  | 5.16 | 83.7 |
| 33. | " | 10 | 100 |  | 8.17 | 74.2 |
| 34. | " | 1 | 100 |  | 14.51 | 54.2 |
| 35 | " | 1 | 100 |  | 15.76 | 50.3 |
| 36. | E-100+Cr(NO₃)₃ | 10 | 100 |  | 4.64 | 85.4 |
| 37. | " | 10 | 100 |  | 2.59 | 91.8 |
| 38. | " | 1 | 100 |  | 12.22 | 61.5 |
| 39. | " | 1 | 100 |  | 13.70 | 56.8 |

[1]10 cc 50% aqueous DEA
[2]10 cc MEA

TABLE XI

50% DEA $H_2S/CO_2$ 9/1

| | Compound | PPM | PPM | PPM | Corrosion Rate MPY | Percent Inhibition |
|---|---|---|---|---|---|---|
| 1. | Blank | | | | 50.31 | −0.6 |
| 2. | Blank | | | | 51.56 | −3.1 |
| 3. | Blank | | | | 48.10 | 3.8 |
| 4. | EDA Ethylenediamine | 10 | | | 38.39 | 23.2 |
| 5. | " | 10 | | | 37.79 | 24.4 |
| 6. | " | 100 | | | 22.62 | 54.8 |
| 7. | " | 100 | | | 24.24 | 51.5 |
| 8. | TETA Triethylenetetramine | 10 | | | 32.63 | 34.7 |
| 9. | " | 10 | | | 29.91 | 40.2 |
| 10. | " | 100 | | | 20.32 | 59.3 |
| 11. | " | 100 | | | 19.23 | 61.5 |
| 12. | TEPA Tetraethylene pentamine | 10 | | | 18.41 | 63.2 |
| 13. | " | 10 | | | 26.52 | 47.0 |
| 14. | " | 100 | | | 10.68 | 78.6 |
| 15. | " | 100 | | | 12.97 | 74.1 |
| 16. | PEI-3 | 10 | | | 2.95 | 94.1 |
| 17. | " | 10 | | | 3.25 | 93.5 |
| 18. | " | 100 | | | 1.47 | 97.1 |
| 19. | " | 100 | | | 1.47 | 97.1 |
| 20. | EDA+$CuCO_3$+S° | 10 | 10 | 10 | 38.46 | 23.1 |
| 21. | " | 10 | 10 | 10 | 40.22 | 19.5 |
| 22. | " | 100 | 10 | 10 | 14.59 | 70.8 |
| 23. | " | 100 | 10 | 10 | 14.22 | 71.6 |
| 24. | TETA+$CuCO_3$+S° | 10 | 10 | 10 | 15.69 | 68.6 |
| 25. | " | 10 | 10 | 10 | 17.02 | 66.0 |
| 26. | " | 100 | 10 | 10 | 5.45 | 89.1 |
| 27. | " | 100 | 10 | 10 | 5.44 | 89.1 |
| 28. | TEPA+$CuCO_3$+S° | 10 | 10 | 10 | 4.87 | 90.3 |
| 29. | " | 10 | 10 | 10 | 4.79 | 90.4 |
| 30. | " | 100 | 10 | 10 | 4.27 | 91.5 |
| 31. | " | 100 | 10 | 10 | 4.27 | 91.5 |
| 32. | PEI-3+$CuCO_3$+S° | 10 | 10 | 10 | 1.91 | 96.2 |
| 33. | " | 10 | 10 | 10 | 2.06 | 95.9 |
| 34. | E-100+$CuCO_3$+S° | 1 | 10 | 10 | 5.23 | 89.5 |
| 35. | " | 1 | 10 | 10 | 4.72 | 90.6 |

TABLE XII

50% DEA $H_2S/CO_2$ 9/1

| | Compound | PPM | PPM | PPM | Corrosion Rate MPY | Percent Inhibition |
|---|---|---|---|---|---|---|
| 1. | Blank | | | | 29.02 | −2.4 |
| 2. | Blank | | | | 28.07 | 0.9 |
| 3. | Blank | | | | 27.91 | 1.5 |
| 4. | E-100 | 10 | | | 9.13 | 67.8 |
| 5. | " | 10 | | | 10.09 | 64.4 |
| 6. | " | 100 | | | 2.95 | 89.6 |
| 7. | " | 100 | | | 2.87 | 89.9 |
| 8. | $CuCO_3$ in 50% DEA | 10 | | | 31.68 | −11.8 |
| 9. | " | 10 | | | 38.97 | −37.5 |
| 10. | " | 100 | | | 11.42 | 59.7 |
| 11. | " | 100 | | | 9.43 | 66.7 |
| 12. | $Ni(NO_3)_2 \cdot 6H_2O$ | 10 | | | 27.85 | 1.7 |
| 13. | " | 10 | | | 28.80 | −1.6 |
| 14. | Bis(2-aminoethyl)ether | 1000 | | | 14.51 | 48.8 |
| 15. | " | 1000 | | | 15.69 | 44.6 |
| 16. | E-100+$CuCO_3$ | 10 | 10 | | 3.83 | 86.5 |
| 17. | " | 10 | 10 | | 3.61 | 87.3 |
| 18. | E-100 +$CuCO_3$+$Ni^{+2}$ | 10 | 10 | 10 | 3.32 | 88.3 |
| 19. | " | 10 | 10 | 10 | 3.83 | 86.5 |
| 20. | (Bis(3-aminoethyl)ether + $CuCO_3$ | 1000 | 10 | | 10.76 | 62.0 |
| 21. | " | 1000 | 10 | | 10.47 | 63.1 |
| 22. | " | 1000 | 100 | | 3.68 | 87.0 |
| 23. | " | 1000 | 100 | | 4.13 | 85.4 |
| 24. | TRT-3 (KW-17) | 1000 | | | 2.28 | 91.9 |
| 25. | " | 1000 | | | 1.91 | 93.3 |

TABLE XIII

50% DEA $CO_2/H_2S$ 10/1

| | Compound | PPM | PPM | PPM | Corrosion Rate MPY | Percent Inhibition |
|---|---|---|---|---|---|---|
| 1. | Blank | | | | 6.78 | |
| 2. | Blank | | | | 5.81 | |
| 3. | Blank | | | | 6.19 | |
| 4. | EA-10 (E-100) | 1 | | | 3.16 | 49.6 |
| 5. | " | 1 | | | 3.09 | 50.6 |
| 6. | " | 10 | | | 1.11 | 82.2 |
| 7. | " | 10 | | | 1.18 | 81.1 |
| 8. | " | 100 | | | 0.66 | 89.4 |
| 9. | " | 100 | | | 0.66 | 89.4 |
| 10. | " | 1000 | | | 0.52 | 91.7 |
| 11. | " | 1000 | | | 0.30 | 95.2 |
| 12. | PEI-3 | 10 | | | 0.60 | 90.5 |

TABLE XIII-continued

50% DEA CO₂/H₂S 10/1

| | Compound | PPM | PPM | PPM | Corrosion Rate MPY | Percent Inhibition |
|---|---|---|---|---|---|---|
| 13. | " | 10 | | | 0.74 | 88.2 |
| 14. | " | 1000 | | | 0.52 | 91.7 |
| 15. | " | 1000 | | | 0.52 | 91.7 |
| 16. | TRT-3 | 1000 | | | 0.96 | 84.7 |
| 17. | " | 1000 | | | 0.89 | 85.8 |
| 18. | EA-10 + CuCO₃ + S° | 10 | 10 | 10 | 0.88 | 86.0 |
| 19. | " | 10 | 10 | 10 | 1.03 | 83.5 |
| 20. | PEI-3 + CuCO₃ + S° | 10 | 10 | 10 | 0.97 | 84.6 |
| 21. | " | 10 | 10 | 10 | 0.89 | 85.8 |
| 22. | CuCO₃ + S° | 10 | 3 | | 7.30 | −16.5 |
| 23. | " | 10 | 10 | | 7.51 | −19.9 |
| 24. | CuCO₃ | 10 | | | 7.15 | −14.2 |
| 25. | " | 10 | | | 7.00 | −11.8 |
| 26. | RCC-9 + NH₄SCN + EA-10 | 500 | 50 | 100 | | 65.9 |
| 27. | " | 500 | 50 | 100 | 1.76 | 71.8 |
| 28. | RCC-9 | 500 | | | 6.26 | −0.0 |
| 29. | " | 500 | | | 6.05 | 3.4 |
| 30. | NH₄SCN | 50 | | | 6.26 | −0.0 |
| 31. | " | 50 | | | 6.05 | 3.4 |
| 32. | RCC:9 + NH₄SCN | 500 | 50 | | 5.82 | 7.0 |
| 33. | " | 500 | 50 | | 5.82 | 7.0 |
| 34. | RCC-9 + NH₄SCN + EA-10 | 500 | 50 | 10 | 2.36 | 62.3 |
| 35. | " | 500 | 50 | 10 | 1.99 | 68.2 |

TABLE XIV

70% DEA H₂S/CO₂ 9/1

| | Compound | PPM | PPM | PPM | Corrosion Rate MPY | Percent Inhibition |
|---|---|---|---|---|---|---|
| 1. | Blank | | | | 28.44 | 1.7 |
| 2. | Blank | | | | 29.38 | −1.6 |
| 3. | Blank | | | | 28.96 | −0.1 |
| 4. | E-100 | .5 | | | 13.78 | 52.4 |
| 5. | " | .5 | | | 15.18 | 47.5 |
| 6. | " | 10 | | | 12.23 | 57.7 |
| 7. | " | 10 | | | 11.86 | 59.0 |
| 8. | " | 1000 | | | 1.76 | 93.9 |
| 9. | " | 1000 | | | 10.53 | 63.6 |
| 10. | PEI-6 | 1 | | | 24.17 | 16.5 |
| 11. | " | 1 | | | 24.39 | 15.7 |
| 12. | " | 10 | | | 12.81 | 55.7 |
| 13. | " | 10 | | | 12.38 | 57.2 |
| 14. | " | 1000 | | | 1.84 | 93.6 |
| 15. | " | 1000 | | | 1.76 | 93.9 |
| 16. | CuCO₃ in MEA | 10 | | | 21.29 | 26.4 |
| 17. | " | 10 | | | 27.26 | 5.8 |
| 18. | CuCO₃ | 100 | | | 9.36 | 67.6 |
| 19. | " | 100 | | | 9.66 | 66.6 |
| 20. | " | 1000 | | | 5.52 | 80.9 |
| 21. | " | 1000 | | | 5.45 | 81.2 |
| 22. | PEI-6 + CUCO₂ | 10 | 100 | | 2.44 | 91.6 |
| 23. | " | 10 | 100 | | 2.15 | 92.6 |
| 24. | " | 1000 | 100 | | 1.55 | 94.6 |
| 25. | " | 1000 | 100 | | 1.54 | 94.7 |
| 26. | " | 10 | 1000 | | 1.76 | 93.9 |
| 27. | " | 10 | 1000 | | 1.63 | 94.4 |
| 28. | E-100 + CuCO₃ | 10 | 10 | | 10.82 | 62.6 |
| 29. | " | 10 | 10 | | 1.92 | 93.4 |
| 30. | " | 1000 | 10 | 1.33 | 95.4 | |
| 31. | " | 1000 | 10 | | 1.47 | 94.9 |

TABLE XV

50% MDEA CO₂/H₂S 50/1

| | Compound | PPM | PPM | PPM | Corrosion Rate MPY | Percent Inhibition |
|---|---|---|---|---|---|---|
| 1. | Blank | | | | 8.54 | 0.3 |
| 2. | Blank | | | | 8.54 | 0.3 |
| 3. | Blank | | | | 8.62 | −0.6 |
| 4. | EA-10 | 10 | | | 0.66 | 92.3 |
| 5. | EA-10 | 10 | | | 1.03 | 87.9 |
| 6. | EA-10 | 100 | | | 0.89 | 89.6 |
| 7. | EA-10 | 100 | | | 0.88 | 89.8 |
| 8. | EA-10 | 1000 | | | 0.81 | 90.6 |
| 9. | EA-10 | 1000 | | | 0.81 | 90.6 |
| 10. | EA-10 + CuCO₃ + S° | 10 | 10 | 10 | 1.33 | 84.5 |
| 11. | EA-10 + CuCO₃ + S° | 10 | 10 | 10 | 1.33 | 84.5 |
| 12. | CuCO₃ + S° | 10 | 10 | | 6.12 | 28.6 |
| 13. | CuCO₃ + S° | 10 | 10 | | 6.62 | 22.7 |
| 14. | CuCO₃ | 10 | | | 7.44 | 13.2 |
| 15. | CuCO₃ | 10 | | | 6.55 | 23.5 |
| 16. | FO-3 | 1000 | | | 5.82 | 32.1 |
| 17. | FO-3 | 1000 | | | 3.32 | 61.3 |
| 18. | FO-6 | 1000 | | | 6.49 | 24.3 |
| 19. | FO-3 | 1000 | | | 6.55 | 23.5 |
| 20. | RCC-9 | 500 | | | 6.18 | 27.9 |
| 21. | RCC-9 | 500 | | | 5.45 | 36.4 |
| 22. | NH₄SCN | 50 | | | 5.97 | 30.3 |
| 23. | NH₄SCN | 50 | | | 6.10 | 28.8 |
| 24. | RCC-9 + NH₄SCN | 500 | 50 | | 5.01 | 41.5 |
| 25. | RCC-9 + NH₄SCN | 500 | 50 | | 4.13 | 51.9 |
| 26. | FO-3 + NH₄SCN | 1000 | 50 | | 3.25 | 62.1 |
| 27. | FO-3 + NH₄SCN | 1000 | 50 | | 5.00 | 41.6 |
| 28. | RCC-9 + NH₄SCN + EA-10 | 500 | 50 | 10 | 2.44 | 71.5 |
| 29. | RCC-9 + NH₄SCN + EA-10 | 500 | 50 | 10 | 3.83 | 55.3 |
| 30. | RCC-9 + NH₄SCN + EA-10 | 500 | 50 | 100 | 1.18 | 86.2 |
| 31. | RCC-9 + NH₄SCN + EA-10 | 500 | 50 | 100 | 0.73 | 91.5 |
| 32. | RCC-9 + NH₄SCN + EA-10 | 500 | 50 | 1000 | 0.89 | 89.6 |
| 33. | RCC-9 + NH₄SCN + EA-10 | 500 | 50 | 1000 | 0.66 | 92.3 |
| 34. | FO-3 + NH₄SCN + EA-10 | 1000 | 50 | 10 | 1.84 | 78.5 |
| 35. | FO-3 + NH₄SCN + EA-10 | 1000 | 50 | 10 | 1.84 | 78.5 |
| 36. | FO-3 + SCN + EA-10 | 1000 | 50 | 100 | 0.96 | 88.8 |
| 37. | FO-3 + NH₄SCN + EA-10 | 1000 | 50 | 100 | 0.96 | 88.8 |

TABLE XVI

30% MEA H₂S/CO₂ 9/1

| | Compound | PPM | PPM | PPM | Corrosion Rate MPY | Percent Inhibition |
|---|---|---|---|---|---|---|
| 1. | Blank | | | | 23.80 | 4.2 |
| 2. | Blank | | | | 24.97 | −0.5 |
| 3. | Blank | | | | 25.79 | −3.8 |
| 4. | E-100 | 10 | | | 10.24 | 58.8 |
| 5. | E-100 | 10 | | | 8.69 | 65.0 |
| 6. | E-100 | 100 | | | 6.55 | 73.6 |
| 7. | E-100 | 100 | | | 6.78 | 72.7 |
| 8. | E-75 | 10 | | | 10.84 | 56.4 |
| 9. | E-75 | 10 | | | 10.39 | 58.2 |
| 10. | E-75 | 100 | | | 6.19 | 75.1 |
| 11. | E-75 | 100 | | | 6.70 | 73.0 |
| 12. | PEI-3 | 10 | | | 4.42 | 82.2 |

TABLE XVI-continued
30% MEA H₂S/CO₂ 9/1

| Compound | PPM | PPM | PPM | Corrosion Rate MPY | Percent Inhibition |
|---|---|---|---|---|---|
| 13. PEI-3 | 10 | | | 4.71 | 81.0 |
| 14. PEI-3 | 100 | | | 2.51 | 89.9 |
| 15. PEI-3 | 100 | | | 2.65 | 89.3 |
| 16. PEI-6 | 10 | | | 7.73 | 68.9 |
| 17. PEI-6 | 10 | | | 8.17 | 67.1 |
| 18. PEI-6 | 100 | | | 6.26 | 74.8 |
| 19. PEI-6 | 100 | | | 4.64 | 81.3 |
| 20. TRT-3 | 1000 | | | 7.37 | 70.3 |
| 21. TRT-3 | 1000 | | | 8.32 | 66.5 |
| 22. E-100 + CuCO₃ + S° | 10 | 10 | 10 | 4.19 | 83.1 |
| 23. E-100 + CuCO₃ + S° | 10 | 10 | 10 | 4.13 | 83.4 |
| 24. E-75 + CuCO₃ + S° | 10 | 10 | 10 | 3.98 | 84.0 |
| 25. E-75 + CuCO₃ + S° | 10 | 10 | 10 | 3.32 | 86.7 |
| 26. PEI-3 + CuCO₃ + S° | 10 | 10 | 10 | 5.01 | 79.8 |
| 27. PEI-3 + CuCO₃ + S° | 10 | 10 | 10 | 5.97 | 76.0 |
| 28. PEI-6 + CuCO₃ + S° | 10 | 10 | 10 | 3.01 | 87.9 |
| 29. PEI-6 + CuCO₃ + S° | 10 | 10 | 10 | 2.65 | 89.3 |
| 30. CuCO₃ + S° | | 10 | 10 | 13.04 | 47.5 |
| 31. CuCO₃ + S° | | 10 | 10 | 14.30 | 42.5 |

TABLE XVII
50% N-Methyl DEA H₂S/CO₂ 9/1

| Compound | PPM | PPM | PPM | Corrosion Rate MPY | Percent Inhibition |
|---|---|---|---|---|---|
| 1. Blank | | | | 25.64 | 1.7 |
| 2. Blank | | | | 24.83 | 4.8 |
| 3. Blank | | | | 27.78 | -6.5 |
| 4. E-100 | 10 | | | 18.49 | 29.1 |
| 5. E-100 | 10 | | | 19.15 | 26.6 |
| 6. E-100 | 100 | | | 2.14 | 91.8 |
| 7. E-100 | 100 | | | 1.91 | 92.7 |
| 8. E-75 | 10 | | | 21.45 | 17.8 |
| 9. E-75 | 10 | | | 23.64 | 9.4 |
| 10. E-75 | 100 | | | 1.84 | 92.9 |
| 11. E-75 | 100 | | | 1.84 | 92.9 |
| 12. PEI-3 | 10 | | | 2.43 | 90.7 |
| 13. PEI-3 | 10 | | | 2.57 | 90.1 |
| 14. PEI-3 | 100 | | | 1.62 | 93.8 |
| 15. PEI-3 | 100 | | | 2.07 | 92.1 |
| 16. PEI-6 | 10 | | | 2.59 | 90.1 |
| 17. PEI-6 | 10 | | | 7.96 | 69.5 |
| 18. PEI-6 | 100 | | | 1.99 | 92.4 |
| 19. PEI-6 | 100 | | | 1.70 | 93.5 |
| 20. TRT-3 | 1000 | | | 1.92 | 92.6 |
| 21. TRT-3 | 1000 | | | 2.50 | 90.4 |
| 22. TRT-3 | 100 | | | 6.99 | 73.2 |
| 23. TRT-3 | 100 | | | 4.34 | 83.4 |
| 24. CuCO₃ | | 10 | | 16.50 | 36.7 |
| 25. CuCO₃ | | 10 | | 16.79 | 35.6 |
| 26. CuCO₃ + S° | | 10 | 10 | 16.94 | 35.1 |
| 27. CuCO₃ + S° | | 10 | 10 | 18.42 | 29.4 |
| 28. S° | | | 10 | 27.25 | -4.5 |
| 29. S° | | | 10 | 27.03 | -3.6 |
| 30. E-100 + CuCO₃ + S° | 10 | 10 | 10 | 2.28 | 91.3 |
| 31. E-100 + CuCO₃ + S° | 10 | 10 | 10 | 2.28 | 91.3 |
| 32. E-75 + CuCO₃ + S° | 10 | 10 | 10 | 2.59 | 90.1 |
| 33. E-75 + CuCO₃ + S° | 10 | 10 | 10 | 2.28 | 91.3 |
| 34. PEI-3 + CuCO₃ + S | 10 | 10 | 10 | 1.98 | 92.4 |
| 35. PEI-3 + CuCO₃ + S° | 10 | 10 | 10 | 1.91 | 92.7 |
| 36. PEI-6 + CuCO₃ + S° | 10 | 10 | 10 | 2.80 | 89.3 |
| 37. PEI-6 + CuCO₃ + S° | 10 | 10 | 10 | 3.90 | 85.0 |

TABLE XVIII
50% MDEA CO₂/H₂S 10/1

| Compound | PPM | PPM | PPM | Corrosion Rate MPY | Percent Inhibition |
|---|---|---|---|---|---|
| 1. Blank | | | | 20.19 | |
| 2. Blank | | | | 20.63 | |
| 3. Blank | | | | 19.51 | |
| 4. EA-10 | 10 | | | 1.54 | 92.3 |
| 5. " | 10 | | | 2.44 | 87.9 |
| 6. " | 1000 | | | 1.25 | 93.8 |
| 7. " | 1000 | | | 1.25 | 93.8 |
| 8. PEI-3 | 10 | | | 1.25 | 93.8 |
| 9. " | 10 | | | 1.41 | 93.0 |
| 10. " | 1000 | | | 0.30 | 98.5 |
| 11. " | 1000 | | | 1.11 | 94.5 |
| 12. EA-10 + CuCO₃ + S° | 10 | 10 | 10 | 1.17 | 94.2 |
| 13. " | 10 | 10 | 10 | 1.03 | 94.9 |
| 14. PEI-3 + CuCO₃ + S° | 10 | 10 | 10 | 1.03 | 94.9 |
| 15. " | 10 | 10 | 10 | 1.18 | 94.1 |
| 16. CuCO₃ + S° | | 10 | 10 | 11.13 | 44.7 |
| 17. " | | 10 | 10 | 10.90 | 45.8 |
| 18. CuCO₃ | | 1000 | | 7.14 | 64.5 |
| 19. " | | 1000 | | 7.59 | 62.3 |
| 20. SH-1 | 1000 | | | 10.16 | 49.5 |
| 21. " | 1000 | | | 10.68 | 46.9 |
| 22. EA-18 | 1000 | | | 19.22 | 4.4 |
| 23. " | 1000 | | | 18.35 | 8.8 |
| 24. EA-24[1] | 1000 | | | 1.33 | 93.4 |
| 25. " | 1000 | | | 1.25 | 93.8 |
| 26. FO-3 | 1000 | | | 7.52 | 62.6 |
| 27. " | 1000 | | | 7.81 | 61.2 |
| 28. RCC-9 | 500 | | | 8.98 | 55.3 |
| 29. " | 500 | | | 8.69 | 56.8 |
| 30. RCC-9 + NH₄SCN | 500 | 50 | | 9.06 | 54.9 |
| 31. " | 500 | 50 | | 8.77 | 56.4 |
| 32. RCC-9 + NH₄SCN + EA-10 | 500 | 50 | 10 | 5.97 | 70.3 |
| 33. " | 500 | 50 | 10 | 6.26 | 68.9 |
| 34. " | 500 | 50 | 1000 | 1.55 | 92.3 |
| 35. " | 500 | 50 | 1000 | 1.10 | 94.5 |

[1]Union Carbide polyamine D

TABLE XIX
40% MIPA H₂S/CO₂ 9/1

| Compound | PPM | PPM | PPM | Corrosion Rate MPY | Percent Inhibition |
|---|---|---|---|---|---|
| 1. Blank | | | | 14.73 | 2.2 |
| 2. Blank | | | | 15.25 | -1.3 |
| 3. Blank | | | | 15.18 | -0.8 |
| 4. E-100 | 1000 | | | 3.24 | 78.5 |
| 5. " | 1000 | | | 3.17 | 78.9 |
| 6. E-75 | 1000 | | | 4.05 | 73.1 |
| 7. " | 1000 | | | 4.05 | 73.1 |
| 8. PEI-3 | 1000 | | | 1.18 | 92.2 |
| 9. " | 1000 | | | 1.70 | 88.7 |
| 10. PEI-6 | 1000 | | | 3.25 | 78.4 |
| 11. " | 1000 | | | 3.32 | 78.0 |
| 12. KW-17 | 1000 | | | 6.49 | 56.9 |
| 13. " | 1000 | | | 5.74 | 61.8 |
| 14. CuCO₃ | 1000 | | | 2.80 | 81.4 |
| 15. " | 1000 | | | 2.95 | 80.4 |
| 16. CuCO₃ in 50% DEA | 10 | | | 12.89 | 14.3 |
| 17. " | 10 | | | 12.52 | 16.8 |

TABLE XX
50% DEA H₂S/CO₂/COS 8/1/1

| Compound | PPM | PPM | PPM | Corrosion Rate MYP | Percent Inhibition |
|---|---|---|---|---|---|
| 1. Blank | | | | 47.89 | -0.0 |
| 2. Blank | | | | 47.74 | 0.3 |
| 3. Blank | | | | 48.03 | -0.3 |
| 4. E-100 | 1000 | | | 1.39 | 97.1 |
| 5. E-100 | 1000 | | | 1.47 | 96.9 |
| 6. E-75 | 1000 | | | 1.47 | 96.9 |
| 7. E-75 | 1000 | | | 1.69 | 96.5 |
| 8. PEI-3 | 1000 | | | 1.17 | 97.6 |
| 9. PEI-3 | 1000 | | | 1.17 | 97.6 |
| 10. PEI-6 | 1000 | | | 1.55 | 96.8 |
| 11. PEI-6 | 1000 | | | 1.99 | 95.8 |
| 12. TRT-3 | 1000 | | | 2.06 | 95.7 |
| 13. TRT-3 | 1000 | | | 2.14 | 95.5 |
| 14. OA-70 | 2000 | | | 33.67 | 29.7 |
| 15. OA-70 | 2000 | | | 35.35 | 26.2 |
| 16. CuCO₃ in DEA + S° | 10 | 10 | | 59.52 | -24.3 |
| 17. CuCO₃ in DEA + S° | 10 | 10 | | 66.60 | -39.1 |
| 18. CuCO₃ | 1000 | | | 8.70 | 81.8 |
| 19. CuCO₃ | 1000 | | | 8.04 | 83.2 |
| 20. E-100 + CuCO₃ + S° | 10 | 10 | 10 | 3.24 | 93.2 |
| 21. E-100 + CuCO₃ + S° | 10 | 10 | 10 | 2.81 | 94.1 |
| 22. E-100 | 10 | | | 19.23 | 59.8 |
| 23. E-100 | 10 | | | 16.58 | 65.4 |
| 24. PEI-3 | 10 | | | 2.59 | 94.6 |

TABLE XX-continued

| | 50% DEA H₂S/CO₂/COS 8/1/1 | | | | |
|---|---|---|---|---|---|
| Compound | PPM | PPM | PPM | Corrosion Rate MYP | Percent Inhibition |
| 25. PEI-3 | 10 | | | 2.95 | 93.8 |
| 26. PEI-3 + CuCO₃ + S° | 10 | 10 | 10 | 2.20 | 95.4 |
| 27. PEI-3 + CuCO₃ + S° | 10 | 10 | 10 | 2.21 | 95.4 |
| 28. 1,2-polypropyleneimine | 1000 | | | 7.96 | 83.4 |
| 29. 1,2-polypropyleneimine | 1000 | | | 7.22 | 84.9 |

What is claimed is:

1. A corrosion inhibited aqueous N-methyldiethanolamine or diethanolamine acid gas treating solution consisting essentially of (1) an amine compound or mixture of compounds having the formula

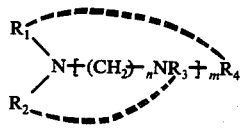

wherein $n$ is an integer from 1 to 3, $m$ is an integer 2 to an integer to yield a molecular weight of about 800 and each R represents a member selected from the group consisting of —H, —$C_{n'}H_{2n'}OH$, $C_{n'}H_{2n'}$, or —$C_{n'}H_{2n'}N(R_3)R_4$, $n'$ is an integer from 1 to 2, and wherein $R_1R_3$ and $R_2R_4$ are joined together and $n'$ is 2; said compound being present in about 10 to about 2000 parts per million parts treating solution; (2) copper or a copper ion yielding compound in from 0 to 1000 ppm; and (3) sulfur or a sulfur atom yielding compound in from 0 to 1000 ppm.

2. The corrosion inhibited composition of claim 1 wherein the amine compound is polyethylene polyamine mixture having an average molecular weight of about 250-300.

3. The corrosion inhibited composition of claim 1 wherein the amine compound is polyethylenimine having a molecular weight of about 600.

4. The corrosion inhibited composition of claim 1 wherein the amine compound is polyethylenimine having an average molecular weight of about 300.

5. The corrosion inhibited composition of claim 1 wherein the amine compound is a polyethylene polyamine having an average molecular weight of about 250-300.

6. The corrosion inhibited composition of claim 1 wherein the amine compound is tris(aminoethyl)amine, mixed branched-linear.

7. The corrosion inhibited composition of claim 1 wherein the amine compound is a mixture of 35 to 45 weight percent diethylenetriamine, 10–15 weight percent triethylenediamine

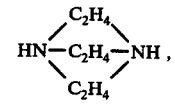

and 5 to 15 percent piperazine.

8. The corrosion inhibited composition of claim 1 wherein the amine compound is pentaethylenehexaamine.

9. The corrosion inhibited composition of claim 1 wherein the amine compound is a polymeric mixture of triethylenetetraamine and divinylbenzene.

10. The corrosion inhibited composition of claim 1 wherein the amine compound is the reaction product of divinylbenzene, ethylvinylbenzene and diethylenetriamine.

11. The corrosion inhibited composition of claim 1 wherein the amine compound is diethylenetriamine.

12. The corrosion inhibited composition of claim 1 wherein the amine compound is methylchloride quaternary salt of divinylbenzene diethylenetriamine.

13. The corrosion inhibited composition of claim 1 wherein the amine compound is tetraethylene pentaamine.

14. The corrosion inhibited composition of claim 1 wherein the amine compound is a solids free mixture of 8-9 weight percent tetraethylene pentamine, 30-35 weight percent pentaethylene hexamine and 55 weight percent hexaethylene heptamine and the balance branched and cyclic isomers having an average molecular weight of about 250 to 300.

15. The corrosion inhibited composition of claim 1 wherein the amine compound is a mixture of 85 weight percent aminoethyl piperazine and 15 weight percent diethylenetriamine.

* * * * *

UNITED STATES PATENT AND TRADEMARK OFFICE
CERTIFICATE OF CORRECTION

PATENT NO. : 4,096,085                             Page 1 of 3

DATED      : June 20, 1978

INVENTOR(S) : Smallwood Holoman, Jr., Robert G. Asperger and
              Leroy S. Krawczyk It is certified that error appears in the above-identified patent and that said Letters Patent are hereby corrected as shown below:

Column 2, Line 29, delete the "λ" after -- $C_nH_{2n}$ --.

Column 3, Line 9, "monisopropanola" should be
                  -- monoisopropanola --.

Column 3, Line 48, "weighted" should be -- weighed --.

Column 4, Table I heading "I" should be -- 1 --.

Column 4, Table I heading "COmpound" should be -- Compound --.

Column 4, Table I footnote (2), "polyethylenime" should be
                  -- polyethylenimine --.

Column 5, Table IV Compound 5, "90.0" should be -- 90.9 --.

Column 7, Table V continued Compound 9, the figures "6.96" and
                  "81.1" should be moved over 2 columns.

Column 8, Table VII in the heading "Dea" should be -- DEA --.

Column 9, Table VII continued item 37, "$CuCO_{3/+S}o$" should be
                  -- $CuCO_3+S^o$ --.

Column 9, Table VIII item 33 Column 2, delete "α" and insert
                  -- " --

Column 10 Table X item 30, -- 100 -- should be inserted under
                  PPM and "1.54", "95.1" should be
                  moved over 1 column.

UNITED STATES PATENT AND TRADEMARK OFFICE
CERTIFICATE OF CORRECTION

PATENT NO. : 4,096,085

DATED : June 20, 1978

INVENTOR(S) : Smallwood Holoman, Jr., Robert G. Asperger and Leroy S. Krawczyk

It is certified that error appears in the above-identified patent and that said Letters Patent are hereby corrected as shown below:

Column 11 Table XI item 20, "$CuCO_{3+S}O$" should be -- $CuCO_3+S^O$ --.

Column 11 Table XII item 20 "(Bis(3-aminoethyl) ether" should be -- (Bis(2-aminoethyl) ether --.

Column 13, Table XIII continued item 22 "3" should be -- 10 --.

Column 13 Table XIII item 26, insert -- 2.14 -- and -- 65.9 -- in columns 5 and 6 respectively.

Column 13, delete first item 27 line.

Column 13 item 33, figures -- 500 --, -- 50 --, -- 5.82 -- and -- 7.0 -- should be moved over one column Column 13 Table XIV in the heading "ercent" should be -- Percent --.

Column 13 Table XIV item 22 "$CUCO_2$" should be -- $CuCO_3$ --.

Column 13 Table XIV item 30 -- 1.33 -- and -- 95.4 -- should be moved over one column.

Column 13 Table XV compound 10, "$S^{OO}$" should be -- $S^O$ --.

Column 14 Table XV continued compound 19, "FO-3" should be -- FO-6 --.

Column 14 Table XV continued, insert -- $NH_4$ -- before "SCN".

UNITED STATES PATENT AND TRADEMARK OFFICE
CERTIFICATE OF CORRECTION

PATENT NO. : 4,096,085

DATED : June 20, 1978

INVENTOR(S) : Smallwood Holoman, Jr., Robert G. Asperger and Leroy S. Krawczyk

It is certified that error appears in the above-identified patent and that said Letters Patent are hereby corrected as shown below:

Column 15 Table XVI continued, Compound 14 "PEi-3" should be -- PEI-3 --.

Column 15 Table XVI continued, Compound 25 delete the -- " -- after "$CuCO_3$".

Column 15 Table XVII, Compound 34 "S" should be -- $S^o$ --.

Column 16 Table XX in the heading "MYP" should be -- MPY --.

Column 17 Table XX continued in the heading "MYP" should be -- MPY --

Column 17, Line 27 "-- $C_n$, $H_{2n}$,,$N(R_3)$ $R_4$, n'" should be -- --$C_n$,$H_{2n}$,$N(R_3)R_4$, n; --.

Signed and Sealed this

Fifteenth Day of May 1979

[SEAL]

Attest:

RUTH C. MASON
*Attesting Officer*

DONALD W. BANNER
*Commissioner of Patents and Trademarks*